(12) United States Patent
Kim

(10) Patent No.: US 10,303,378 B2
(45) Date of Patent: May 28, 2019

(54) DATA STORAGE DEVICE

(71) Applicant: SK hynix Inc., Gyeonggi-do (KR)

(72) Inventor: Eui Jin Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 82 days.

(21) Appl. No.: 15/189,788

(22) Filed: Jun. 22, 2016

(65) Prior Publication Data

US 2017/0242600 A1  Aug. 24, 2017

(30) Foreign Application Priority Data

Feb. 24, 2016 (KR) .................... 10-2016-0021943

(51) Int. Cl.
*G06F 3/06* (2006.01)

(52) U.S. Cl.
CPC .......... *G06F 3/0619* (2013.01); *G06F 3/0655* (2013.01); *G06F 3/0656* (2013.01); *G06F 3/0679* (2013.01)

(58) Field of Classification Search
CPC ............. G06F 11/1068; G06F 12/0246; G06F 3/0619; G06F 11/1016; G06F 3/0679; G06F 3/0688; G06F 3/0659; G06F 12/1009; G06F 2212/2022; G06F 2212/7201; G06F 2212/7203; G06F 3/061
See application file for complete search history.

(56) References Cited

U.S. PATENT DOCUMENTS

| | | | | |
|---|---|---|---|---|
| 2004/0156251 | A1* | 8/2004 | Shiota | G11C 16/349 365/200 |
| 2009/0172279 | A1* | 7/2009 | Yuan | G06K 7/0008 711/115 |
| 2012/0221884 | A1 | 8/2012 | Carter et al. | |
| 2013/0166825 | A1* | 6/2013 | Kim | G06F 12/0246 711/103 |
| 2016/0210052 | A1* | 7/2016 | Kanno | G06F 3/0604 |
| 2016/0283308 | A1* | 9/2016 | Earhart | G06F 11/08 |

FOREIGN PATENT DOCUMENTS

KR  1020110113503  10/2011

\* cited by examiner

*Primary Examiner* — Reginald G Bragdon
*Assistant Examiner* — Thanh D Vo
(74) *Attorney, Agent, or Firm* — IP & T Group LLP

(57) ABSTRACT

A data storage device includes a host interface unit for generating a host request based on a request received from a host device; a control unit for generating a task based on the host request; and a memory control unit for controlling a nonvolatile memory device based on the task, wherein, when it is determined that an operation of the nonvolatile memory device has failed, the memory control unit transmits a fail information regarding the failed operation to the host interface unit.

16 Claims, 9 Drawing Sheets

FIG. 2

| Information | Structure | | | Meaning |
|---|---|---|---|---|
| HRQ | OP(LA/BMA) | OP | W | Write |
| | | | R | Read |
| | | LA | | Access-requested logical address |
| | | BMA (Optional) | | Buffer memory address stored with write-requested data |
| WFI | WFI(LA/BMA) | LA | | Write-failed logical address |
| | | BMA | | Buffer memory address stored with write-failed data |
| TSK | OP(LA/PA/BMA) | OP | W | Write |
| | | | R | Read |
| | | | RR | Read retry |
| | | LA | | Access-requested logical address |
| | | PA | | Physical address corresponding to access-requested logical address (address of nonvolatile memory device) |
| | | BMA (Optional) | | - Buffer memory address stored with write-requested data<br>- Buffer memory address stored with read-out data |

DATA STORAGE DEVICE

CROSS-REFERENCES TO RELATED APPLICATION

The present application claims priority under 35 U.S.C. § 119(a) to Korean application number 10-2016-0021943, filed on Feb. 24, 2016, in the Korean Intellectual Property Office, which is incorporated herein by reference in its entirety.

BACKGROUND

1. Technical Field

Various embodiments generally relate to a data storage device including a nonvolatile memory device as a storage medium.

2. Related Art

Recently, the paradigm for the computer environment has shifted to ubiquitous computing so that computer systems can be used anytime and anywhere. Due to this, use of portable electronic devices such as mobile phones, digital cameras, and notebook computers has increased rapidly. In general, such portable electronic devices use a data storage device which uses a memory device. A data storage device is used to store data to be used in a portable electronic device.

A data storage device using a memory device provides advantages in that, since there is no mechanical driving part, stability and durability are excellent, an information access speed is high and power consumption is small. Data storage devices having such advantages include a universal serial bus (USB) memory device, memory cards having various interfaces, a universal flash storage (UFS) device, and a solid state drive (SSD).

SUMMARY

Various embodiments are directed to a data storage device capable of smoothly processing queued tasks even though a write operation fails.

Also, various embodiments are directed to a data storage device capable of efficiently performing processing of an error due to a fall of a write operation.

In an embodiment, a data storage device may include: a host interface unit for generating a host request based on a request received from a host device; a control unit for generating a task based on the host request; and a memory control unit for controlling a nonvolatile memory device based on the task, wherein, when it is determined that an operation of the nonvolatile memory device has failed, the memory control unit transmits a fail information regarding the failed operation to the host interface unit.

In an embodiment, a method for operating a data storage device may include: generating, by a host interface unit, a host request based on a request received from a host device; generating, by a control unit, a task based on the host request; controlling, by a memory control unit, a nonvolatile memory device based on the task; and if an operation of the nonvolatile memory device has failed, by the memory control unit, generating a fail information regarding the failed operation.

In an embodiment, a data storage device may include: a host interface unit for, when a write request for a first logical address and a read request for a second logical address are transmitted from a host device, generating a first host request for the first logical address and a second host request for the second logical address, and enqueuing the first host request and the second host request into a request queue; a control unit for generating a first task and a second task based on the first host request and the second host request, and enqueuing the first task and the second task into a task queue; and a memory control unit for controlling a nonvolatile memory device based on the first task and the second task, wherein, when it is determined that an operation of the nonvolatile memory device controlled according to the first task has failed, the memory control unit transmits a fail information regarding the failed operation to the host interface unit, and transmits a result of an operation of the nonvolatile memory device controlled according to the second task, to the control unit.

According to the embodiments, the write operation of a data storage device may be performed quickly.

BRIEF DESCRIPTION OF THE DRAWINGS

FIG. 2 is a table illustrating data structures transmitted among internal blocks of the data storage device shown in FIG. 1.

DETAILED DESCRIPTION

Figure 1:
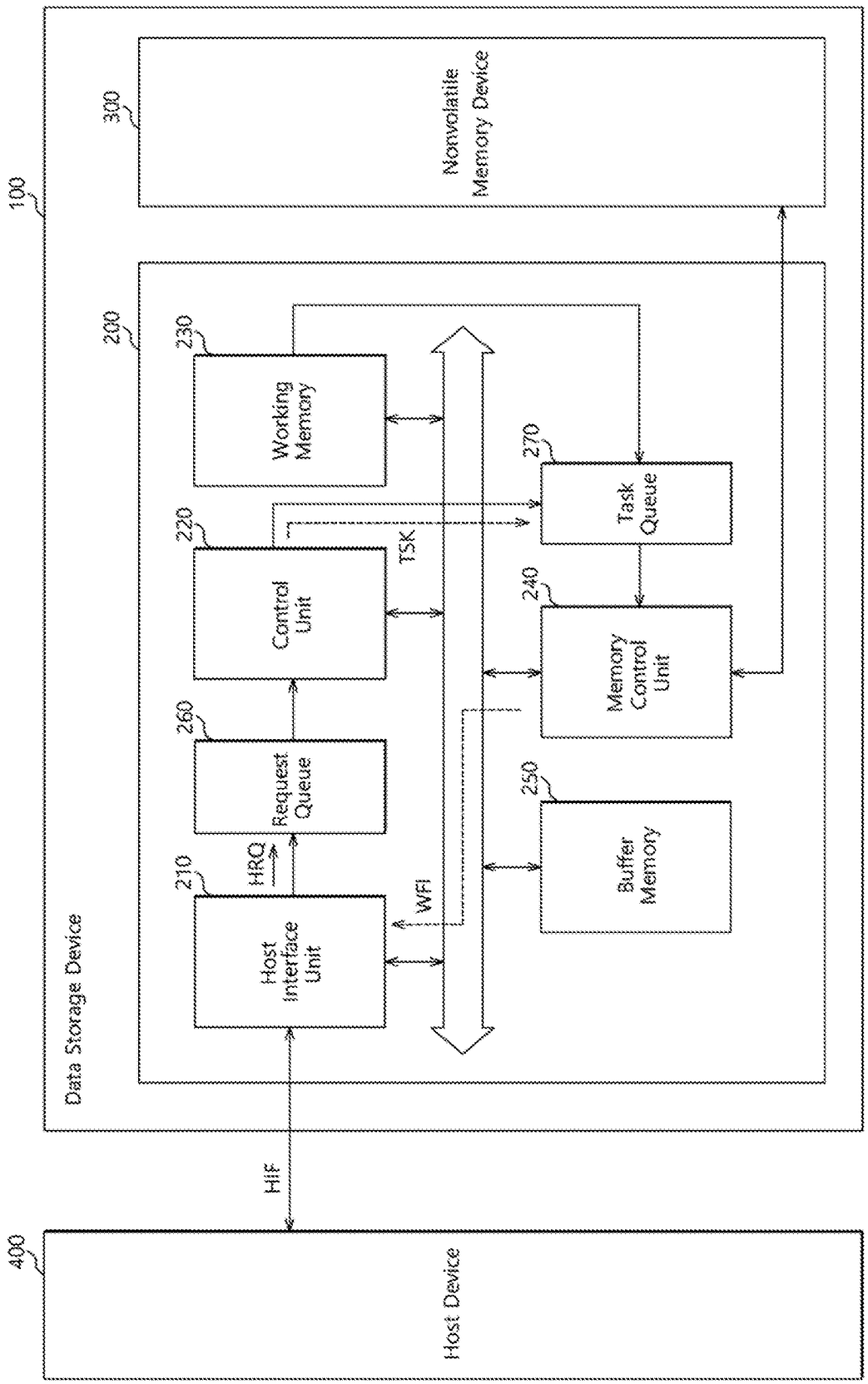
FIG. 1 is a block diagram illustrating a data storage device, in accordance with an embodiment of the present invention.

In the present invention, advantages, features and methods for achieving them will become more apparent after a reading of the following embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can practice the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes," "including," "comprises," and/or comprising when used in this specification, specify the presence of at least one stated feature, step, operation, and/or element, but do not preclude the presence or addition of one or more other features, steps, operations, and/or elements thereof.

Hereinafter, a data storage device will be described below with reference to the accompanying drawings through various examples of embodiments.

FIG. 1 is a block diagram illustrating a data storage device 100, in accordance with an embodiment of the present invention. FIG. 2 is a diagram illustrating a table explaining data structures transmitted among internal blocks of the data storage device 100 shown in FIG. 1.

Referring to FIG. 1, the data storage device 100 may store data to be accessed by a host device 400 such as, for example, a mobile phone, an MP3 player, a laptop computer, a desktop computer, a game player, a TV, an in-vehicle infotainment system, and the like. The data storage device 100 may also be referred to as a memory system.

The data storage device 100 may be manufactured as any one among various storage devices according to a host interface HIF meaning a transmission protocol with respect to the host device 400, such as, for example, a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and the like.

The data storage device 100 may be manufactured as any one among various package types, such as, for example, a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a controller 200 and a nonvolatile memory device 300.

The nonvolatile memory device 300 may operate as a storage medium of the data storage device 100. The nonvolatile memory device 300 may be configured by any one of various nonvolatile memory devices, such as, for example, a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide. The ferroelectric random access memory (FRAM), the magnetic random access memory (MRAM), the phase change random access memory (PCRAM) and the resistive random access memory (RERAM) are nonvolatile random access memory devices capable of random access to memory cells. The nonvolatile memory device 300 may be configured by a combination of a NAND flash memory device and the above-described various types of nonvolatile random access memory devices.

The controller 200 may include a host interface unit 210, a control unit 220, a working memory 230, a memory control unit 240, a buffer memory 250, a request queue 260, and a task queue 270.

The host interface unit 210 may interface the host device 400 and the data storage device 100. For example, the host interface unit 210 may communicate with the host device 400 by using any one among standard transmission protocols, such as, for example, a universal serial bus (USB), a universal flash storage (UFS), a multimedia card (MMC), a parallel advanced technology attachment (PATA), a serial advanced technology attachment (SATA), a small computer system interface (SCSI), a serial attached SCSI (SAS), peripheral component interconnection (PCI) and PCI express (PCI-E) protocols.

The host interface unit 210 may insert or enqueue a host request HRQ generated based on a request transmitted from the host device 400, into the request queue 260. The host request HRQ may be or include a task (or a command) that the control unit 220 performs for processing a request transmitted from the host device 400. When a write request is transmitted from the host device 400, the host interface unit 210 may store data which are transmitted together with the write request (hereafter, also referred to as write-requested data), in the buffer memory 250.

Referring to FIG. 2, the host request HRQ may be configured in the information structure of "OP(LA/BMA)." The host request HRQ may include information regarding what an operation OP for an access-requested logical address LA is. For example, the host request HRQ may include information whether the operation OP is a write operation W or a read operation R. When the write operation W is to be performed for the access-requested logical address LA, the host request HRQ may optionally include information regarding a buffer memory address BMA in which the write-requested data is stored.

Referring again to FIG. 1, the host interface unit 210 may enqueue a host request HRQ into the request queue 260, based on a write fail information WFI transmitted from the memory control unit 240, as if a new request is transmitted from the host device 400 even though no request is transmitted from the host device 400. That is to say, the host interface unit 210 may enqueue the host request HRQ into the request queue 260 based on the write fail information WFI, so that when a write operation for the nonvolatile memory device 300 has failed, a write operation for the write-requested data may be repeated instead of processing an error occurred due to the fail of the write operation.

The control unit 220 may control the general operations of the controller 200. The control unit 220 may, for example, drive an instruction or an algorithm of a code type (e.g., a software) loaded on the working memory 230 in the controller 200, and may control operations of function blocks in the controller 200. The control unit 220 may dequeue the host request HRQ enqueued into the request queue 260. The control unit 220 may analyze and process the dequeued host request HRQ.

The control unit 220 may generate a task TSK based on the dequeued host request HRQ. The control unit 220 may insert or enqueue the task TSK generated based on the dequeued host request HRQ, into the task queue 270. The task TSK may mean a work order in which works to be processed by the memory control unit 240 to control the nonvolatile memory device 300 are written.

Referring again to FIG. 2, the task TSK may be configured in the information structure of "OP(LA/PA/BMA)." The task TSK may include information defining an operation OP for a physical address PA (e.g., an address of the nonvolatile memory device 300) corresponding to an access-requested logical address LA. For example, operation OP may include a write operation W, a read operation R, or a read retry operation RR. When a write operation W is to be performed for the physical address PA corresponding to the access-requested logical address LA, the task TSK may optionally include information regarding a buffer memory address BMA for storing the write-requested data.

Although not shown, an operation OP for a physical address PA may include operations defined in the specification of the nonvolatile memory device 300. For example, an operation OP may be or include an erase operation, a state check operation, a special read operation (e.g., such as, for example, a cache read operation and a multi-plane read operation) other than a general read operation and a special write operation (e.g., a multi-plane write operation) other than a general write operation.

Referring again to FIG. 1, the working memory 230 may store a software to be driven by the control unit 220. The working memory 230 may store data necessary for driving of the software. The working memory 230 may be configured by a random access memory such as, for example, a dynamic random access memory (DRAM), or a static random access memory (SRAM).

The memory control unit 240 may control the nonvolatile memory device 300 according to the task TSK generated by the control unit 220. The memory control unit 240 may generate control signals for controlling the operation of the nonvolatile memory device 300, and provide the generated control signals to the nonvolatile memory device 300. For example, the memory control unit 240 may generate commands, addresses and clock signals for controlling the operation of the nonvolatile memory device 300. The memory control unit 240 may also be referred to as a memory interface unit.

The memory control unit 240 may be provided with, from the nonvolatile memory device 300, a result or a state of an operation that is performed by the nonvolatile memory device 300 controlled according to the task TSK. The memory control unit 240 may check a result or a state of an operation that is performed by the nonvolatile memory device 300 controlled according to the task TSK. In order for a subsequent operation, the memory control unit 240 may transmit a result or a state of an operation of the nonvolatile memory device 300, to the control unit 220 and the host interface unit 210.

When it is determined that a write operation (also referred to as a program operation) of the nonvolatile memory device 300 has failed, the memory control unit 240 may generate information regarding the failed write operation, as the write fail information WFI. The memory control unit 240 may transmit the write fall information WFI to the host interface unit 210.

Referring again to FIG. 2, the write fall information WFI may be configured in the information structure of "WFI(LA/BMA)." The write fail information WFI may include information regarding a write-failed logical address LA and a buffer memory address BMA in which write-failed data is stored.

The buffer memory 250 may temporarily store data to be transmitted from the host device 400 to the nonvolatile memory device 300 or from the nonvolatile memory device 300 to the host device 400. The buffer memory 250 may be configured by a random access memory such as, for example, a DRAM or an SRAM.

Figure 3:
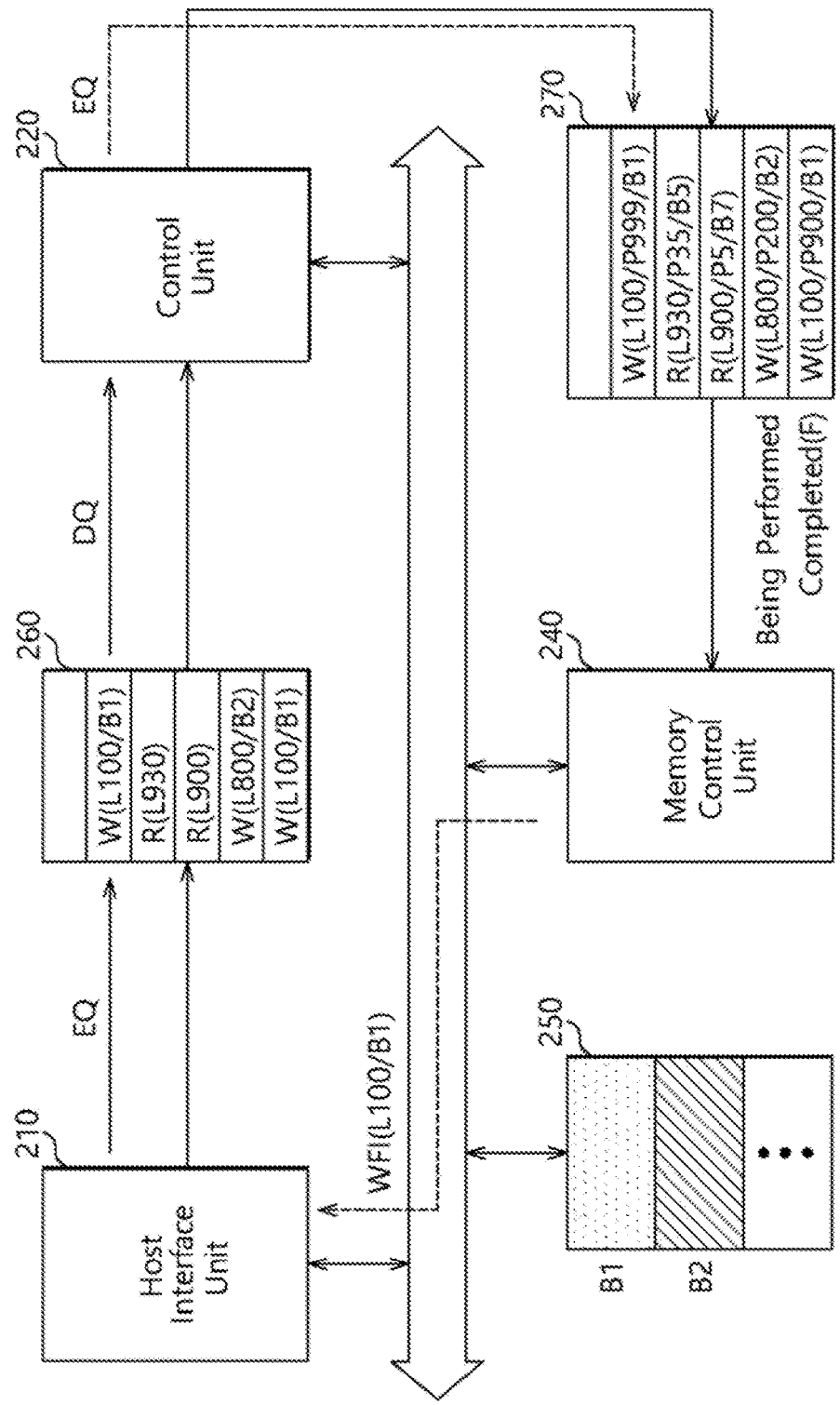
FIG. 3 is a diagram illustrating an operation of a host interface unit for enqueuing a host request into a request queue based on a write fail information, in accordance with an embodiment of the present invention.

FIG. 3 is a diagram illustrating an operation of the host interface unit 210 for enqueuing the host request HRQ into the request queue 260 based on a write fail information WFI, in accordance with an embodiment of the invention.

In describing FIG. 3, it is assumed that write requests for logical addresses L100 and L800 and read requests for logical addresses L900 and L930 are sequentially received from the host device 400 and then a host request HRQ for each of the requests is enqueued into the request queue 260. Moreover, it is assumed that a task W(L100/P900/B1) for the logical address L100 enqueued into the task queue 270 is completed as a fail F and a task W(L800/P200/B2) for the logical address L800 enqueued into the task queue 270 is being performed in the nonvolatile memory device 300.

When it is determined that a write operation of the nonvolatile memory device 300 for the task W(L100/P900/B1) has failed, the memory control unit 240 may generate a write fail information WFI for the logical address L100. The generated write fail information WFI may include information regarding the write-failed logical address L100 and a buffer memory address B1 in which write-failed data is stored.

The host interface unit 210 may enqueue EQ a host request W(L100/B1) for the logical address L100 into the request queue 260, based on the write fail information WFI(L100/B1). In other words, although an additional request for the logical address L100 has not been received from the host device 400, the host interface unit 210 may enqueue EQ the host request W(L100/B1) after a host request R(L930) enqueued last, as if a new request for the logical address L100 has been received from the host device 400.

The control unit 220 may dequeue DQ the latest enqueued host request W(L100/B1). The control unit 220 may generate a task W(L100/P999/B1) based on the host request W(L100/B1) dequeued. For preventing reoccurrence of a write fall, the control unit 220 may generate the new task W(L100/P999/B1) for a physical address PA which is different from the physical address for the failed task W(L100/P900/B1). The control unit 220 may enqueue EQ the generated task W(L100/P999/B1) into the task queue 270.

Through this operation, when a write operation for the nonvolatile memory device 300 has failed, a write operation for write-requested data may be repeated instead of processing an error which occurred due to the fail of the write operation.

Figure 4:
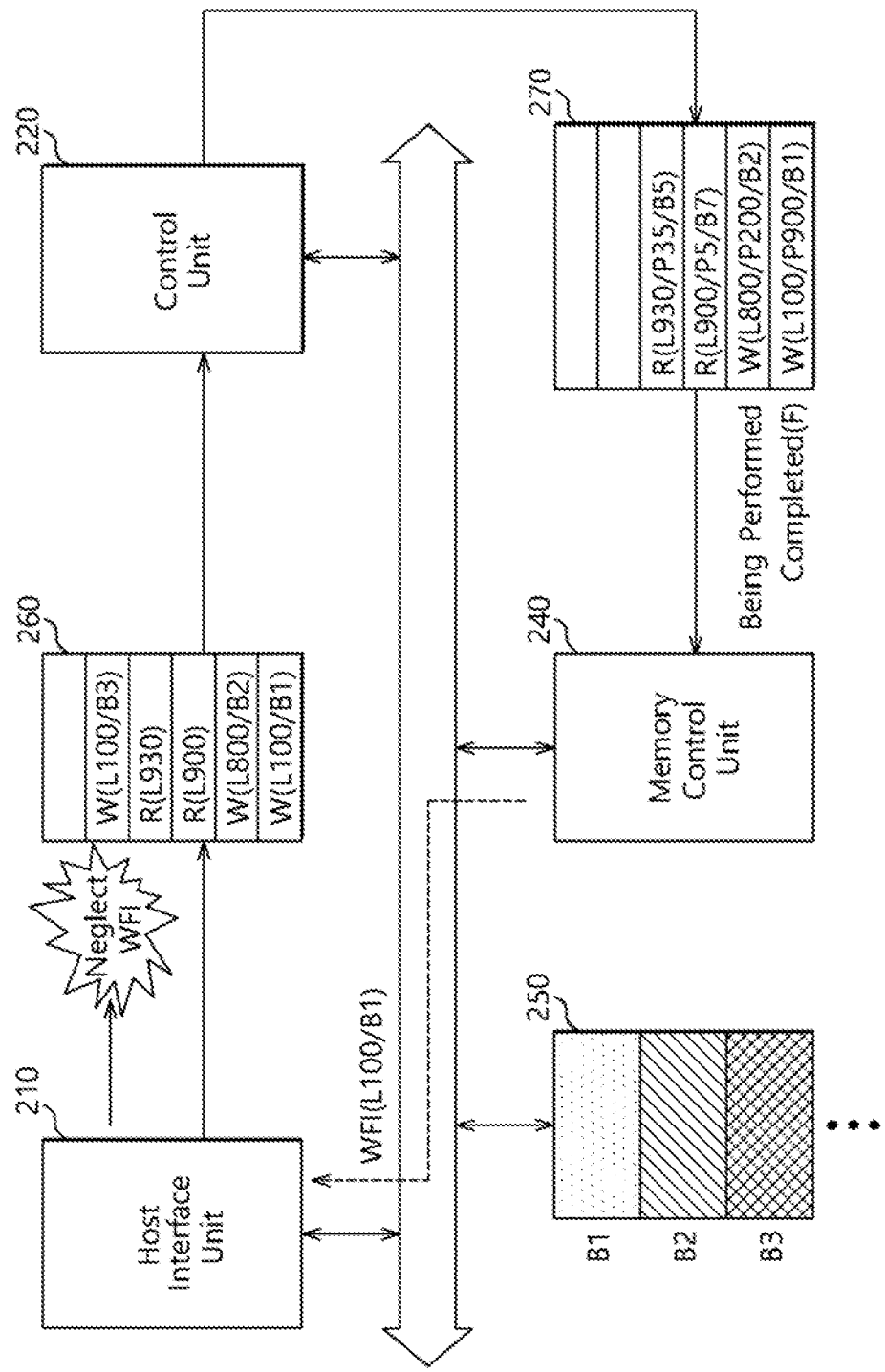
FIG. 4 is a diagram illustrating an exceptional processing of the host interface unit for enqueuing a host request into the request queue based on a write fail information, in accordance with an embodiment of the present invention.

FIG. 4 is a diagram illustrating an exceptional processing of the host interface unit 210 for enqueuing the host request HRQ into the request queue 260 based on the write fail information WFI in accordance with an embodiment of the present invention.

In describing FIG. 4, it is assumed that write requests for logical addresses L100 and L800 and read requests for logical addresses L900 and L930 are received sequentially from the host device 400 in the recited order. Then, a host request HRQ for each of the requests is enqueued into the request queue 260. Moreover, it is assumed that a task W(L100/P900/B1) for the logical address L100 enqueued into the task queue 270 is completed as a fail F and a task W(L800/P200/B2) for the logical address L800 enqueued into the task queue 270 is being performed in the nonvolatile memory device 300. Further, it is assumed that, before a write fall information WFI for notifying the fail of a write operation for the task W(L100/P900/B1) is transmitted to the host interface unit 210, a write request for the logical address L100 is newly received from the host device 400.

When it is determined that the write operation of the nonvolatile memory device 300 for the task W(L100/P900/B1) has failed, the memory control unit 240 may generate the write fail information WFI for the logical address L100. The generated write fail information WFI may include information regarding the write-failed logical address L100 and a buffer memory address B1 in which write-failed data is stored.

When the write request for the logical address L100 is newly received from the host device 400 before the write fail information WFI for notifying the fail of the write operation for the task W(L100/P900/B1) is transmitted to the host interface unit 210, previously received write data should be processed as invalid data and newly received write data should be stored as valid data. For this reason, the host interface unit 210 may disregard the write fail information WFI(L100/B1) for the logic address L100 so that the newly received write data may be stored instead of the previously received write data.

Figure 5:
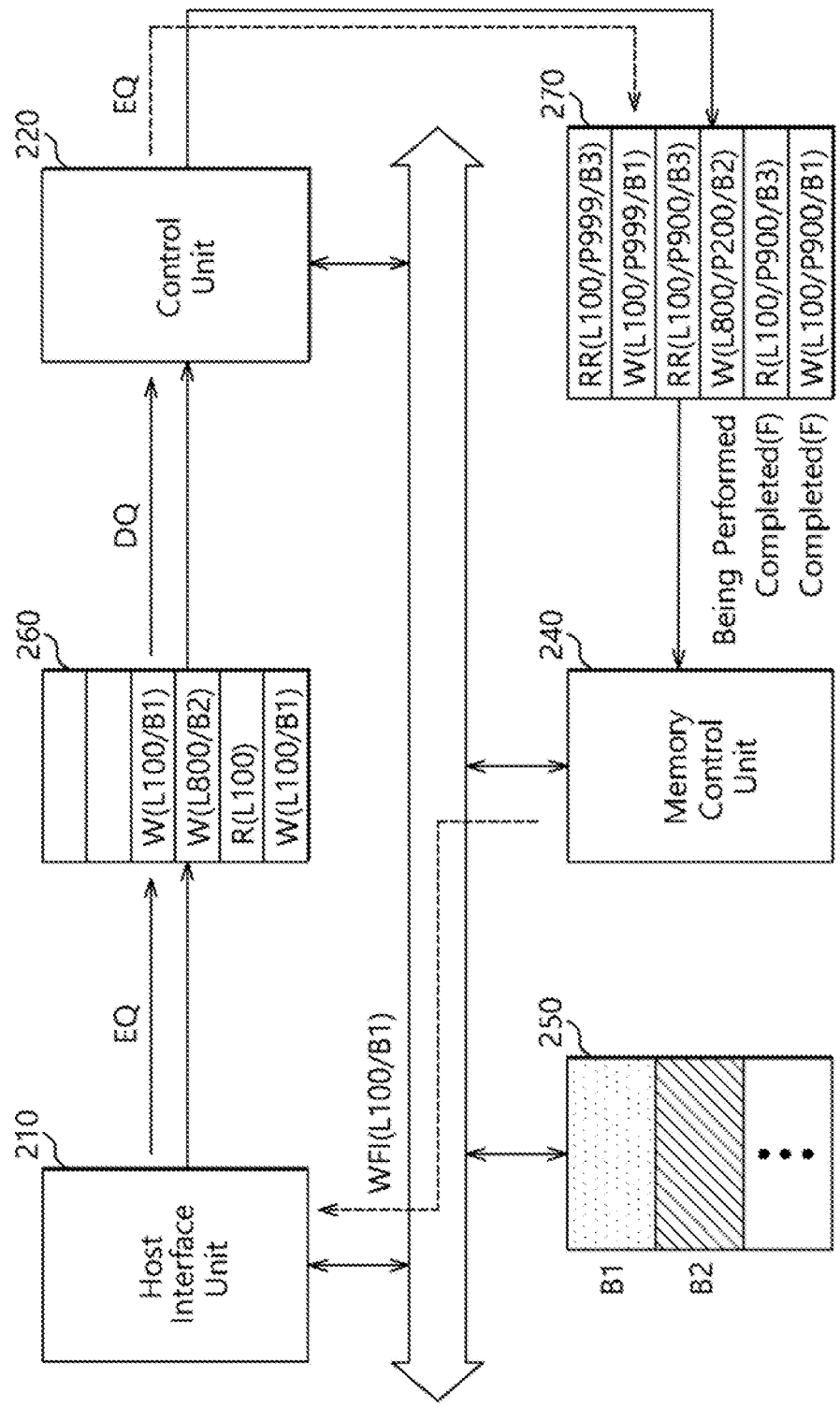
FIG. 5 is a diagram illustrating another exceptional processing of the host interface unit for enqueuing a host request into the request queue based on a write fail information in accordance with another embodiment of the present invention.

FIG. 5 is a diagram illustrating another exceptional processing of the host interface unit 210 for enqueuing the host request HRQ into the request queue 260 based on the write fail information WFI, in accordance with an embodiment of the invention.

In describing FIG. 5, it is assumed that a write request for a logical address L100, a read request for the logical address L100 and a write request for a logical address L800 are received sequentially from the host device 400 in the recited order. Then a host request HRQ for each of the received requests is enqueued into the request queue 260. Moreover, it is assumed that each of a task W(L100/P900/B1) and a task R(L100/P900/B3) for the logical address L100 enqueued into the task queue 270 is completed as a fail F and a task W(L800/P200/B2) for the logical address L800 enqueued into the task queue 270 is being performed in the nonvolatile memory device 300.

When it is determined that a read operation of the nonvolatile memory device 300 has failed, the control unit 220 may retry a read operation for the same logical address LA. This operation is defined as a read retry operation RR. For ensuring that the read retry operation for the read-failed logical address LA is performed, the control unit 220 may generate a task TSK even though a read request is not received from the host device 400. At this time, the control unit 220 may determine whether a physical address PA corresponding to the read-failed logical address LA is changed. Because a physical address PA (e.g., P300) is not changed, as shown in FIG. 5, the control unit 220 may enqueue a new task RR(L100/P900/B3) for the read-failed logical address L100 after the task W(L800/P200/B2) enqueued based on a host request W(L800/B2).

When it is determined that a write operation of the nonvolatile memory device 300 for the task W(L100/P900/B1) has failed, the memory control unit 240 may generate a write fall information WFI for the logical address L100. The generated write fail information WFI may include information regarding the write-failed logical address L100 and a buffer memory address B1 in which write-failed data is stored.

The host interface unit 210 may enqueue EQ a host request W(L100/B1) for the logical address L100 into the request queue 260, based on the write fail information WFI(L100/B1). In other words, although an additional request for the logical address L100 has not been received from the host device 400, the host interface unit 210 may enqueue EQ the host request W(L100/B1) after the latest enqueued host request W(L800/B2) (enqueued last), as if a new request for the logical address L100 has been received from the host device 400.

The control unit 220 may dequeue DQ the host request W(L100/B1) which was last to be enqueued. The control unit 220 may generate a task W(L100/P999/B1) based on the host request W(L100/B1) dequeued. For preventing reoccurrence of a write fail, the control unit 220 may generate the new task W(L100/P999/B1) for a physical address PA which is different from the failed task W(L100/P900/B1). The control unit 220 may enqueue EQ the generated task W(L100/P999/B1) into the task queue 270.

Employing the new task W(L100/P999/B1), the position of a physical address PA in which the write-failed data is stored may be changed, for example, from the physical address P900 to the physical address P999. When the read retry operation for the read-failed logical address L100 has failed as well and thus a read retry operation should be repeated, the control unit 220 may determine whether the physical address PA corresponding to the read-failed logical address LA is changed and generate a new task TSK based on a determination result. When the physical address PA is changed, for example, from the physical address P900 to the physical address P999, the control unit 220 may newly enqueue a task RR(L100/P999/B3) into the task queue 270 so that the read retry operation is performed for the new physical address P999 in which the read-failed data is stored.

Figure 6:
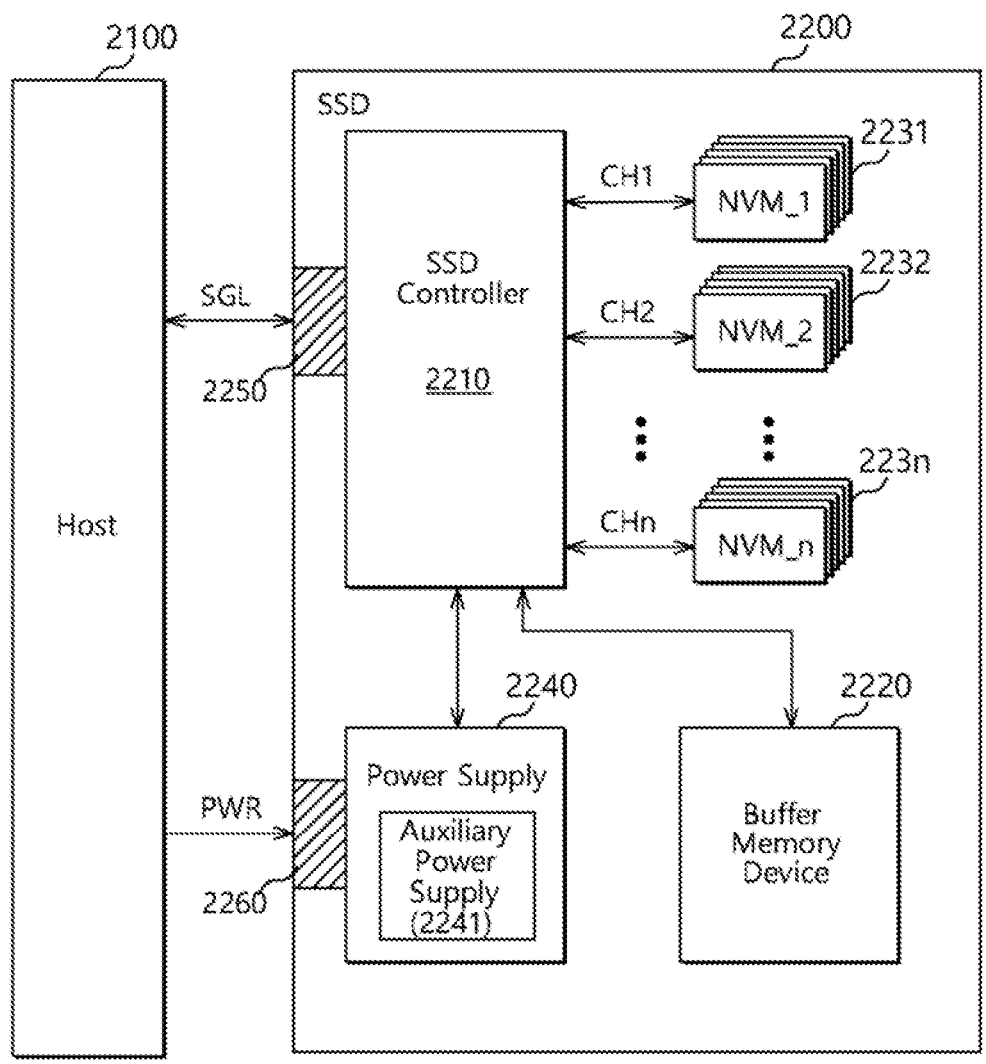
FIG. 6 is a block diagram illustrating a data processing system including a solid state drive (SSD), in accordance with an embodiment of the present invention.

FIG. 6 is a block diagram illustrating a data processing system 2000 including a solid state drive (SSD) 2200 in accordance with an embodiment.

Referring to FIG. 6, the data processing system 2000 may include a host device 2100 and the solid state drive (SSD) 2200.

The SSD 2200 may include an SSD controller 2210, a buffer memory device 2220, nonvolatile memory devices 2231 to 223$n$, a power supply 2240, a signal connector 2250, and a power connector 2260.

The SSD controller 2210 may access the nonvolatile memory devices 2231 to 223$n$ in response to a request from the host device 2100.

The buffer memory device 2220 may temporarily store data which are to be stored in the nonvolatile memory devices 2231 to 223$n$. Further, the buffer memory device 2220 may temporarily store data which are read out from the nonvolatile memory devices 2231 to 223$n$. The data temporarily stored in the buffer memory device 2220 may be transmitted to the host device 2100 or the nonvolatile memory devices 2231 to 223$n$ under control of the SSD controller 2210.

The nonvolatile memory devices 2231 to 223$n$ may be used as storage media of the SSD 2200. The nonvolatile memory devices 2231 to 223$n$ may be coupled with the SSD controller 2210 through a plurality of channels CH1 to CHn, respectively. One or more nonvolatile memory devices may be coupled to one channel. The nonvolatile memory devices coupled to one channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power so as to allow the SSD 2200 to be normally terminated when a sudden power-off occurs. The auxiliary power supply 2241 may include capacitors with large capacitance capable of charging power PWR.

The SSD controller 2210 may exchange a signal SGL with the host device 2100 through the signal connector 2250. The signal SGL may include a command, an address, data, and the like. The signal connector 2250 may be configured by a connector such as one of parallel advanced technology attachment (PATA), serial advanced technology attachment (SATA), small computer system interface (SCSI), serial attached SCSI (SAS), peripheral component interconnection (PCI) and PCI express (PCI-E) protocols, according to an interface scheme between the host device 2100 and the SSD 2200.

Figure 7:
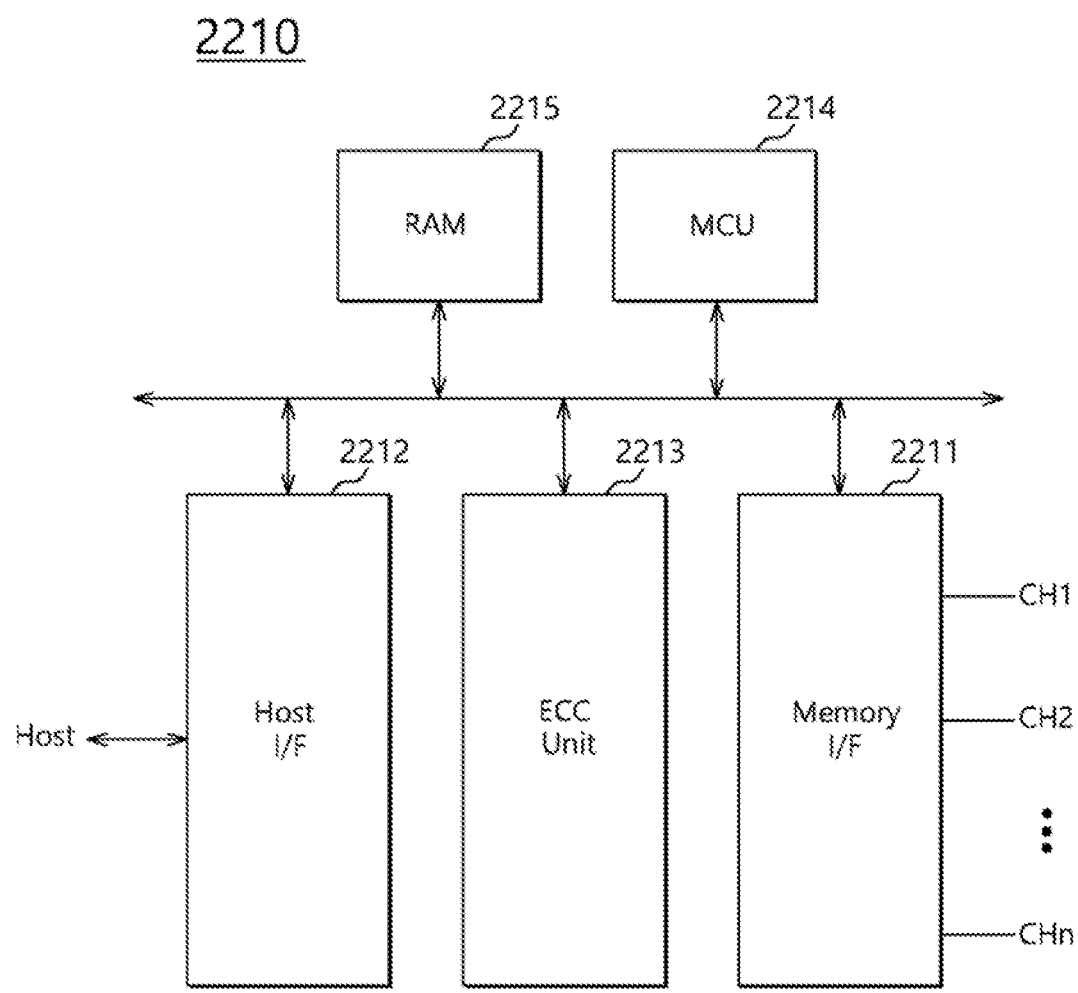
FIG. 7 is a block diagram illustrating an example of a solid state drive (SSD) controller shown in FIG. 6.

FIG. 7 is a block diagram illustrating a solid state drive (SSD) controller 2210 shown in FIG. 6.

Referring to FIG. 7, the SSD controller 2210 may include a memory interface unit 2211, a host interface unit 2212, an error correction code (ECC) unit 2213, a control unit 2214, and a random access memory (RAM) 2215.

The memory interface unit 2211 may provide control signals such as commands and addresses to the nonvolatile memory devices 2231 to 223n. Moreover, the memory interface unit 2211 may exchange data with the nonvolatile memory devices 2231 to 223n. The memory interface unit 2211 may scatter data transmitted from the buffer memory device 2220 to the respective channels CH1 to CHn, under control of the control unit 2214. Furthermore, the memory interface unit 2211 may transmit data read out from the nonvolatile memory devices 2231 to 223n to the buffer memory device 2220, under control of the control unit 2214.

When it is determined that a write (or program) operation of the nonvolatile memory devices 2231 to 223n has failed, the memory interface unit 2211 may generate information regarding the failed write operation, as a write fail information (WFI), and may transmit the generated write fail information (WFI) to the host interface unit 2212.

The host interface unit 2212 may provide an interface with the host device 2100 in correspondence to a certain protocol. For example, the host interface unit 2212 may communicate with the host device 2100 through one of parallel advanced technology attachment (PATA), serial advanced technology attachment (SATA), small computer system interface (SCSI), serial attached SCSI (SAS), peripheral component interconnection (PCI), PCI express (PCI-E) and a universal flash storage (UFS) protocols. In addition, the host interface unit 2212 may perform a disk emulating function of supporting the host device 2100 to recognize the SSD 2200 as a hard disk drive (HDD).

The host interface unit 2212 may transmit a host request to the control unit 2214, based on the write fail information (WFI) transmitted from the memory interface unit 2211, as if a new request is transmitted from the host device 2100 even though no request is transmitted from the host device 2100.

The control unit 2214 may analyze and process the signal SGL inputted from the host device 2100. The control unit 2214 may control operations of the buffer memory device 2220 and the nonvolatile memory devices 2231 to 223n according to a firmware or a software for driving the SSD 2200. The random access memory 2215 may be used as a working memory for driving the firmware or the software.

The error correction code (ECC) unit 2213 may generate parity data to be transmitted to the nonvolatile memory devices 2231 to 223n, among data stored in the buffer memory device 2220. The generated parity data may be stored, along with data, in the nonvolatile memory devices 2231 to 223n. The error correction code (ECC) unit 2213 may detect an error of the data read out from the nonvolatile memory devices 2231 to 223n. When the detected error is within a correctable range, the error correction code (ECC) unit 2213 may correct the detected error.

Figure 8:
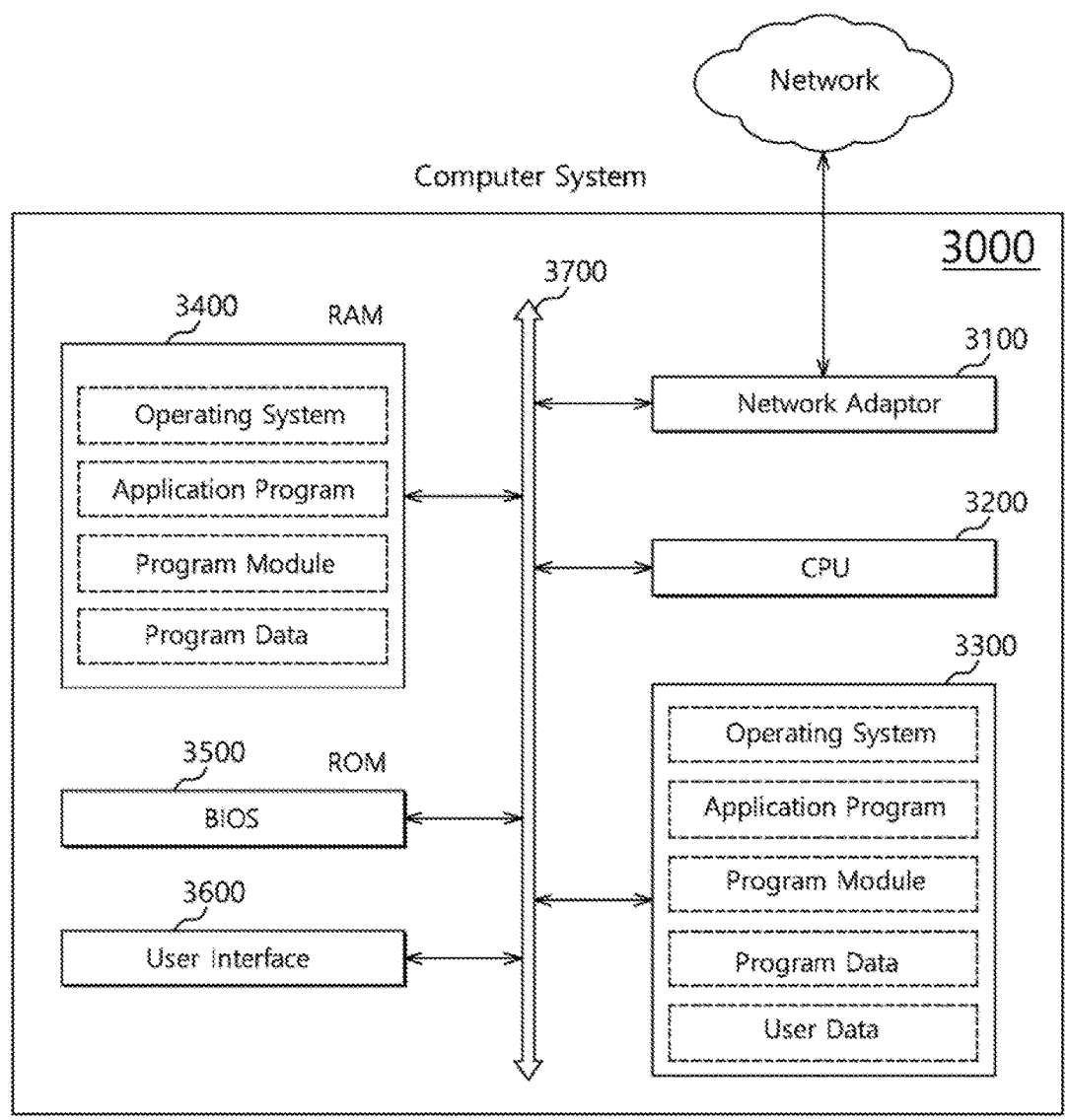
FIG. 8 is a block diagram illustrating a computer system including a data storage device, in accordance with an embodiment of the present invention.

FIG. 8 is a block diagram illustrating a computer system 3000 including a data storage device 3300, in accordance with an embodiment is mounted.

Referring to FIG. 8, the computer system 3000 includes a network adaptor 3100, a central processing unit (CPU) 3200, the data storage device 3300, a random access memory (RAM) 3400, a read only memory (ROM) 3500 and a user interface 3600, which are electrically coupled to a system bus 3700. The data storage device 3300 may be constructed by the data storage device 100 shown in FIG. 1 or the SSD 2200 shown in FIG. 6.

The network adaptor 3100 may provide interfacing between the computer system 3000 and external networks. The central processing unit 3200 may perform general calculation processing for driving an operating system residing at the RAM 3400 or an application program.

The data storage device 3300 may store general data needed in the computer system 3000. For example, an operating system for driving the computer system 3000, an application program, various program modules, program data and user data may be stored in the data storage device 3300.

The RAM 3400 may be used as the working memory of the computer system 3000. Upon booting, the operating system, the application program, the various program modules and the program data needed for driving programs, which are read out from the data storage device 3300, may be loaded on the RAM 3400. A basic input/output system (BIOS) which is activated before the operating system is driven may be stored in the ROM 3500. Information exchange between the computer system 3000 and a user may be implemented through the user interface 3600.

Figure 9:
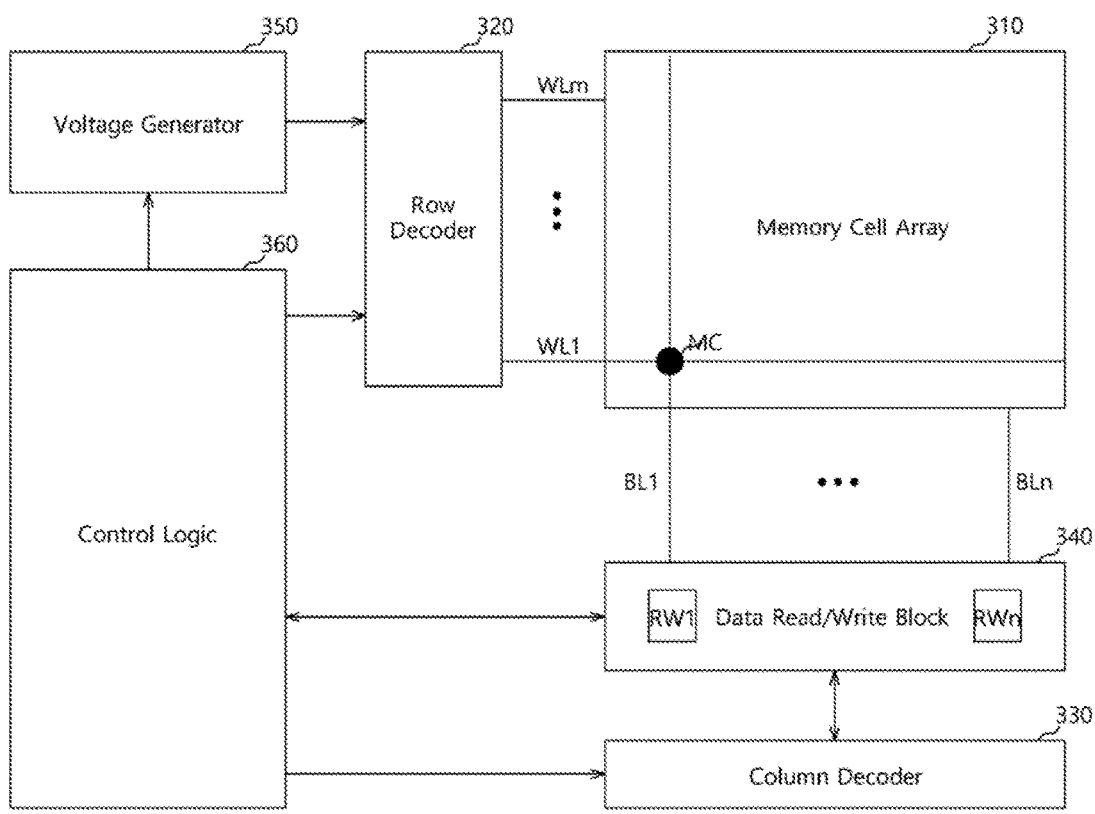
FIG. 9 is a block diagram illustrating a nonvolatile memory device included in a data storage device, in accordance with an embodiment of the present invention.

FIG. 9 is a block diagram illustrating a nonvolatile memory device 300 included in a data storage device in accordance with an embodiment of the present invention.

Referring to FIG. 9, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode addresses provided from an external device (not shown). The row decoder 320 may select and drive the word lines WL1 to WLm, based on decoding results. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 340 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode addresses provided from the external device. The column decoder 340 may couple the read/write circuits RW1 to RWn of the data read/write block 330 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device 300. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the data storage device described herein should not be limited based on the described embodiments.

It is also noted, that in some instances, as would be apparent to those skilled in the relevant art, a feature or element described in connection with one embodiment may be used singly or in combination with other features or elements of another embodiment, unless otherwise specifically indicated.

Although various embodiments have been described for illustrative purposes, it will be apparent to those skilled in the art that various changes and modifications may be made without departing from the spirit and scope of the invention as defined in the following claims.

What is claimed is:

1. A data storage device comprising:
a memory device for storing data; and
a controller for controlling the storage of data to the memory device and for coupling the data storage device to a host,
wherein the controller is suitable for generating a host request based on a request for an operation received from the host, and a task based on the host request for controlling the memory device to perform the host requested operation, the controller comprising:
a host interface unit suitable for generating the host request based on the request received from the host and a write fail information; and
a memory control unit suitable for controlling the memory device based on the task and generating the write fail information when an operation of the memory device has failed, wherein when the host interface unit receives the write fail information to generate the host request, the controller repeats the host requested operation without receiving another request from the host; and
when a new write request for a logical address is received from the host to the host interface unit before the write fail information is received from the memory control unit to the host interface unit, the host interface unit of the controller disregards the write fail information and generate the host request as a new host request base on the new write request to be performed in the controller.

2. The data storage device of claim 1:
wherein the controller further comprises:
a control unit suitable for generating the task based on the host request, wherein, when it is determined that the operation of the memory device has failed, the memory control unit transmits a fail information regarding the failed operation to the host interface unit.

3. The data storage device according to claim 1, wherein the controller generates a host request based on the fail information.

4. The data storage device according to claim 3, wherein the fail information includes the write fail information.

5. The data storage device according to claim 4, wherein the write fail information includes information on a write-failed logical address and a buffer memory address in which write-failed data is stored.

6. The data storage device according to claim 5, wherein when a write request for the logical address is received from the host, the controller is suitable:
for generating the host request as the new host request for the logical address and enqueuing the first host request into a request queue;
for generating a first task based on the new host request and enqueuing the first task into a task queue; and
for controlling the memory device based on the first task.

7. The data storage device according to claim 6, wherein the controller generates the host request as a second host request based on the write fail information and enqueues the generated second host request into the request queue.

8. A data storage device comprising:
a host interface unit suitable for, when a write request for a first logical address and a read request for a second logical address are transmitted from a host, generating a first host request for the first logical address and a second host request for the second logical address, and enqueuing the first host request and the second host request into a request queue;
a control unit suitable for generating a first task and a second task based on the first host request and the second host request, and enqueuing the first task and the second task into a task queue; and
a memory control unit suitable for controlling a nonvolatile memory device based on the first task and the second task,
wherein, when an operation of the nonvolatile memory device controlled according to the first task has failed, the memory control unit transmits a fail information regarding the failed operation as a write fail information to the host interface unit, and transmits a result of an operation of the nonvolatile memory device controlled according to the second task to the control unit,
wherein the control unit determines that a physical address corresponding to the second logical address is changed by a third task and generates a fourth task based on a determination result, and when a new write request for the first logical address is received from the host to the host interface unit before the write fail information included in the fail information is received from the memory control unit to the host interface unit, the host interface unit disregards the write fail information and generate the first host request and the second host request to enqueue the first host request and the second host request into the request queue as a new request queue.

9. The data storage device according to claim 8, wherein the host interface unit generates a third host request based on the write fail information and enqueues the generated third host request into the request queue.

10. The data storage device according to claim 9, wherein the control unit generates the third task based on the third host request and enqueues the third task into the task queue.

11. The data storage device according to claim 10, wherein, when an operation of the nonvolatile memory device controlled according to the second task has failed, the control unit generates the fourth task such that a read operation for the second logical address is repeated, and enqueues the fourth task into the task queue.

12. A method for operating a data storage device which comprises a nonvolatile memory device and a controller comprising a host interface unit and a memory control unit, the method comprising:
  generating a first host request as a host request based on a request received from a host;
  generating a task based on the host request;
  controlling a nonvolatile memory device based on the task;
  generating a fail information regarding the failed operation when an operation of the nonvolatile memory device fails,
  generating a second host request as the host request based on the fail information;
  repeating the generating of the task and the controlling of the nonvolatile memory; and
  when a new host request is received from the host to the host interface unit before a write fail information is received from the memory control unit to the host interface unit, disregarding the write fail information in the controller and repeating the generating of the first host request, the generating of the task, and the controlling of the nonvolatile memory.

13. The method according to claim 12, wherein the fail information includes the write fail information.

14. The method according to claim 13, wherein the write fail information includes information on a write-failed logical address and a buffer memory address in which write-failed data is stored.

15. The method according to claim 12, wherein when the new write request for the logical address is received from the host, the repeating of the generating of the first host request, the generating of the task, and the controlling of the nonvolatile memory, comprises:
  generating the first host request for the logical address and enqueuing the first host request into a request queue;
  generating the task based on the first host request and enqueuing the task into a task queue; and
  controlling the nonvolatile memory device based on the task.

16. The method according to claim 15, wherein the generating of the second host request as the host request based on the fail information, comprises:
  generating a second host request based on the write fail information; and
  enqueuing the generated second host request into the request queue.

* * * * *